(12) United States Patent
Carpenter et al.

(10) Patent No.: US 6,269,153 B1
(45) Date of Patent: Jul. 31, 2001

(54) METHODS AND APPARATUS FOR AUTOMATIC CALL ROUTING INCLUDING DISAMBIGUATING ROUTING DECISIONS

(75) Inventors: Robert Lee Carpenter, New York, NY (US); Jennifer Chu-Carroll, Ramsey, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/124,301

(22) Filed: Jul. 29, 1998

(51) Int. Cl.[7] ................................................. H04M 1/64
(52) U.S. Cl. ........................ 379/88.02; 704/9; 382/159
(58) Field of Search ............................ 379/88.01, 88.02; 704/9; 382/159

(56) References Cited

U.S. PATENT DOCUMENTS 5,371,807 * 12/1994 Register et al. .
5,917,890 * 6/1999 Brotman et al. ................ 379/88.01
6,049,594 * 4/2000 Furman et al. ............... 379/88.03 X

OTHER PUBLICATIONS

A.L. Gorin, G. Riccardi and J.H. Wright, "How May I Help You?", Speech Communication, pp. 1–32.

* cited by examiner

*Primary Examiner*—Creighton Smith
(74) *Attorney, Agent, or Firm*—Priest & Goldstein, PLLC

(57) ABSTRACT

An automatic call routing system for directing a call to a desired destination. The routing system poses questions to a caller and uses the caller's responses create a query which is used to direct the call to a destination associated with one of a plurality of documents created during a training phase. The documents are created by receiving calls, collecting caller contributions to each call, directing each call to a destination by a human operator, and storing and processing the caller contributions to each call directed to a particular destination. If a caller's responses do not permit a call to be unambiguously routed to a destination, the routing system poses clarifying questions and receives caller responses. The caller responses are used to create a refined query for use in a subsequent attempt to route the call.

22 Claims, 8 Drawing Sheets

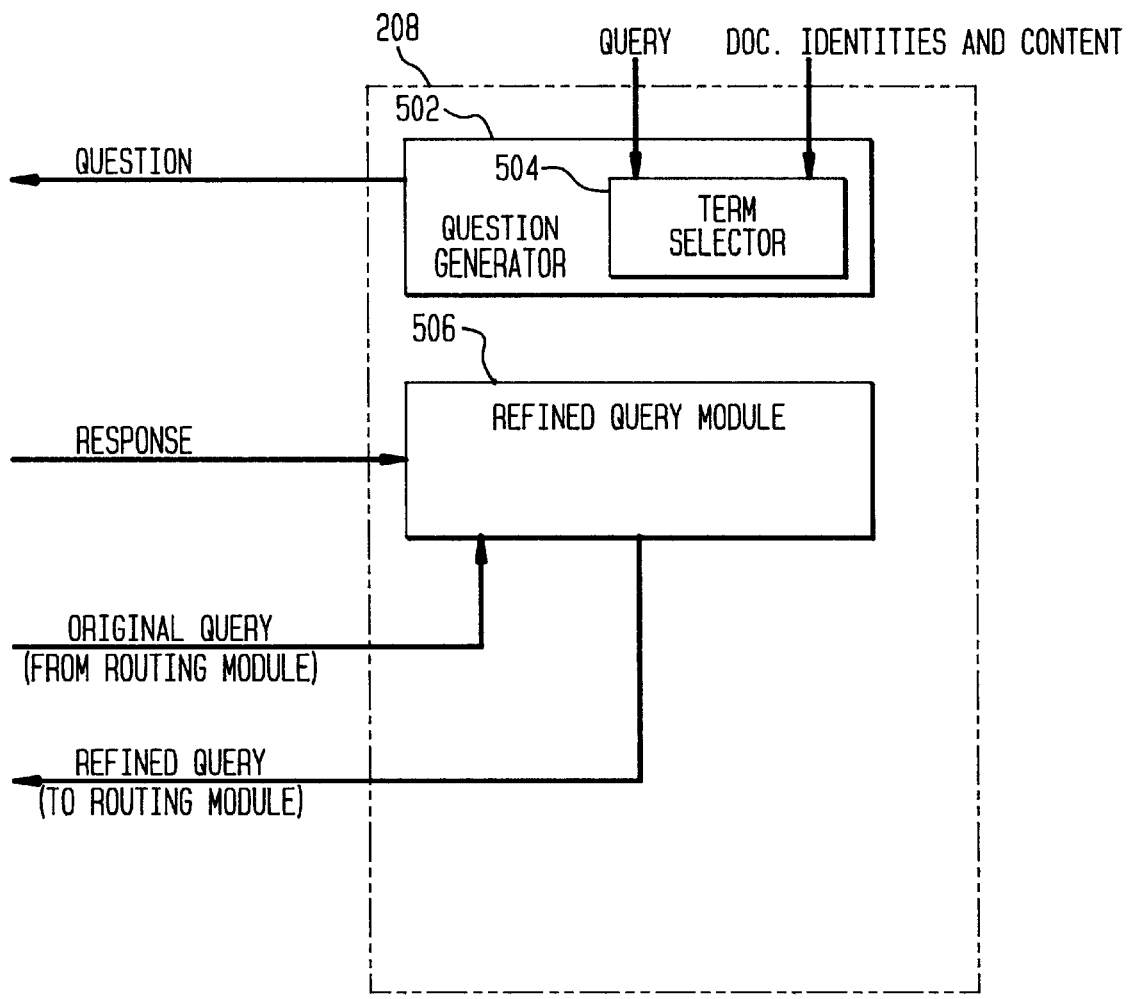

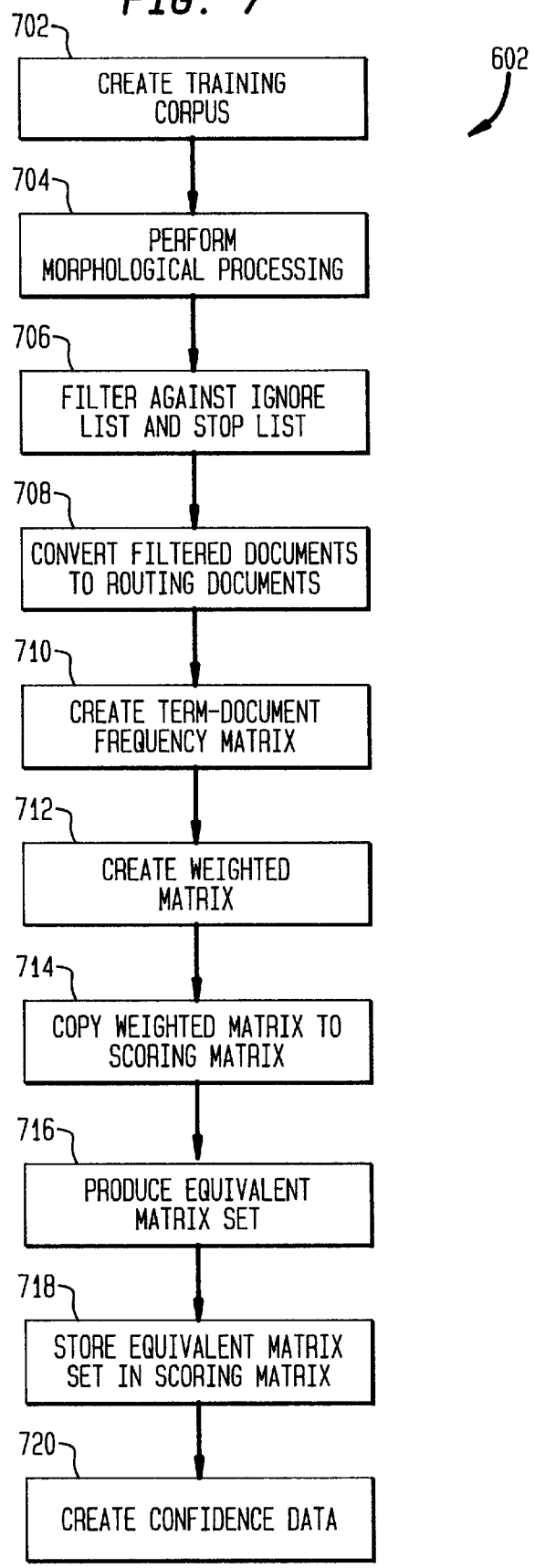

METHODS AND APPARATUS FOR AUTOMATIC CALL ROUTING INCLUDING DISAMBIGUATING ROUTING DECISIONS

FIELD OF THE INVENTION

The present invention relates generally to call routing systems. More particularly, the invention relates to an information retrieval based system for telephone call routing.

BACKGROUND OF THE INVENTION

Almost all organizations of significant size receive numerous telephone calls which must be appropriately handled based on the desires of the caller. This handling or routing is generally performed by human or automated call routing systems. Information is received from the caller, and the call is directed based on the information received. Human operators typically perform this function accurately and efficiently, but at a relatively high cost. Automated systems of the prior art typically employ hierarchical menus in which a caller is confronted with a list of choices from which to select. The caller typically selects menu options by making entries from a telephone keypad. Often, making a choice opens up a menu of further choices. In complex organizations, the menu hierarchy can be quite elaborate, requiring several choices by a caller, and requiring a caller to listen to an elaborate menu in order to understand the available choices. Such menus are a widespread cause of caller dissatisfaction with automated routing systems.

A direct, natural language call routing system, in which a caller asks for a specific destination or describes a function to be performed, would greatly simplify the call routing process, but significant obstacles to such a system exist. Callers typically phrase their requests by giving a destination name, by describing the activity they would like to perform, or else they have difficulty in formulating their requests, and instead provide a roundabout description of what they would like to do. Sometimes the destination name given is ambiguous, in that the organization may have several organizations falling under a similar heading. For example, a request for 'women's clothing' may be appropriately routed to 'women's formal clothing' or 'women's casual clothing' in an organization having such departments but no overarching destination 'women's clothing'. In such an instance, a routing system must determine which of the two destinations is appropriate.

A description of an activity may include words relevant to more than one area in the organization, or may describe a task to be performed with the assistance of two or more destinations in the organization. For example, a request to 'check the balance on my car loan and make a payment from my checking account' describes functions to be performed by a loan department and a checking department of a bank. An automated system must choose a proper first destination to which to route the call.

A roundabout explanation of a desired activity may be too difficult for an automated routing system to resolve. A routing system should be able to recognize a response beyond its capacity, and then route the call to a human operator.

In prior art call routing systems, voice recognition, when it is used, is typically used to substitute for keypad entries. That is, the caller is allowed to voice a number as an alternative to making a keypad entry. The caller is not typically able to describe his desired function to an automated system and have the automated system direct the call according to the description. As presently used in call routing systems, therefore, automated voice recognition does little to simplify the process.

There exists, therefore, a need in the art for a call routing system which can receive voice inputs from a caller and process the voice inputs directly to route a call.

SUMMARY OF THE INVENTION

A call routing system according to the present invention poses questions to a caller and receives and interprets vocal responses from the caller. The call routing system extracts terms from the vocal responses to form a query which is used to make a selection from a corpus, the corpus consisting of a plurality of documents, each document comprising a transcription of calls intended for a particular destination. In one aspect, the system matches a query to a document based on a match of the terms contained in the query with the terms contained in the document. The system may respond to ambiguous responses by posing clarifying questions or referring the call to a human operator. The routing system uses statistical scoring methods to match query terms with documents, and to make decisions about clarifying questions to be asked and about referral to a human operator.

A more complete understanding of the present invention, as well as further features and advantages of the invention, will be apparent from the following Detailed Description and the accompanying drawings.

BRIEF DESCRIPTION OF THE DRAWINGS

FIG. 5 illustrates a disambiguation module for use in a call routing system according to the present invention;

FIG. 7 illustrates a method of training for call routing according to the present invention.

DETAILED DESCRIPTION

Figure 1:
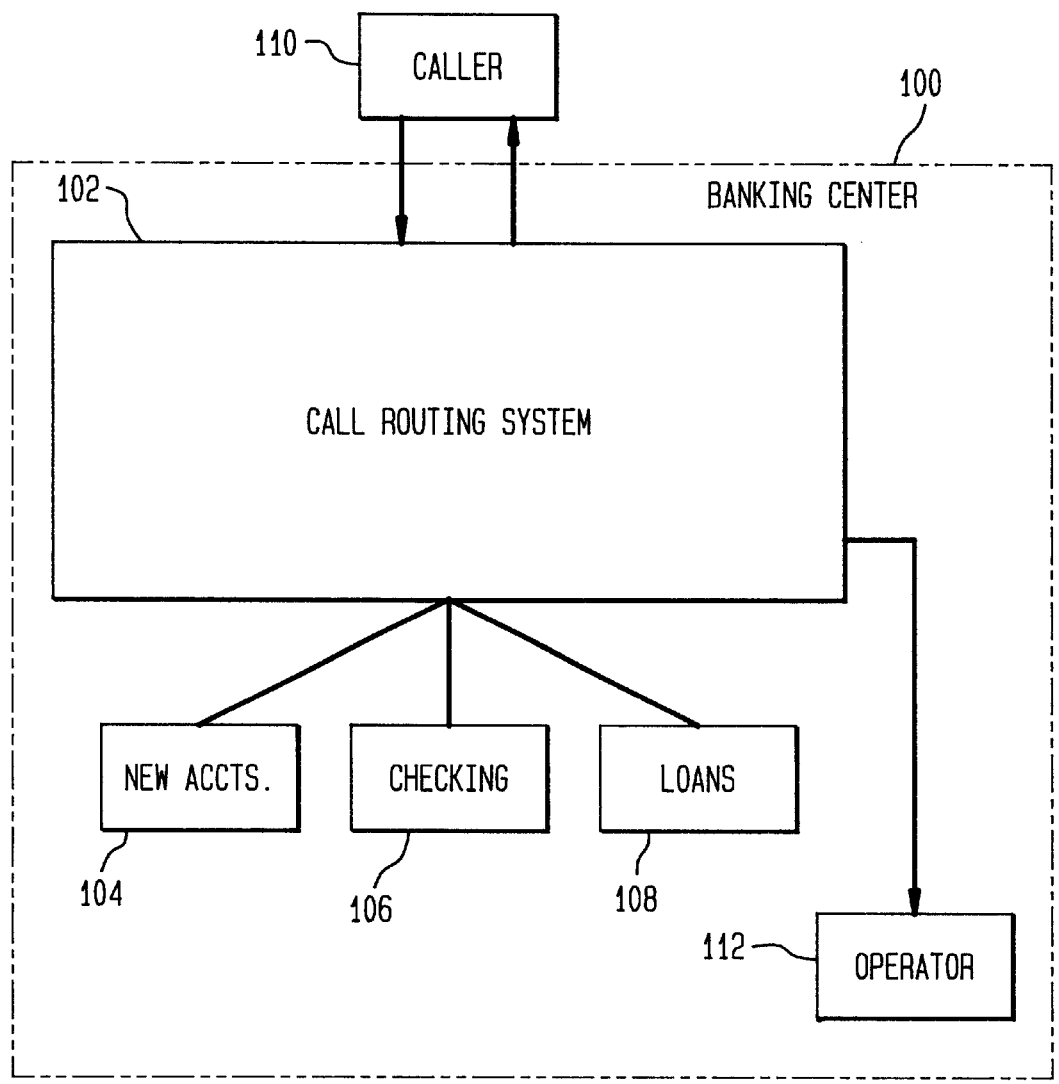
FIG. 1 illustrates a banking center employing a call routing system according to the present invention.

FIG. 1 illustrates a banking center 100 employing a call routing system 102 according to an aspect of the present invention. The banking center receives many different calls each call needing to be routed to an appropriate destination. To provide a simplified illustration the functions required of the call routing system 102, three organizations within the banking center 100 are shown. These are the New Accounts Department 104, the Checking Department 106, and the Loan Department 108. When a caller 110 places a call to the banking center 100, the call routing system 102 answers the call, providing voice information to the caller 110. The call routing system 102 receives voice responses from the caller 110, analyzes the voice responses, and routes the call to the appropriate one of the New Accounts Department 104, the Checking Department 106, or the Loan Department 108. If the call routing system is unable to determine the appropriate destination for the call, the call is directed to a human operator 112.

The call routing function may be quite complex and require subtle differentiation, as similar words may be used to describe different functions. For example, the caller 110 may say 'Checking accounts, please'. This may indicate that the call is to be directed to the New Accounts Department 104, where the caller 110 can inquire about opening a new checking account, or it may indicate that the caller 110 has a question about his already existing checking account, in which case the call should be directed to the Checking Department 106. In this case, it is necessary for the call routing system 102 to pose a disambiguating question to the caller 110 who may then say 'I would like some information about my checking account' In this case, the use of the word 'my' indicates that the caller wants to know about an already existing account. The proper destination of the call is therefore the Checking Department 106. It is advantageous, therefore, for the call routing system to have sufficient subtlety to attach significance to the use of the word 'my' in this context and to use it to determine the correct destination for the call. The call routing system 102 therefore decodes and collects the words used by the caller 110 and employs them to determine the correct destination for the call using methods which predict the likelihood that a call containing particular words will be intended for a particular destination.

Figure 2:
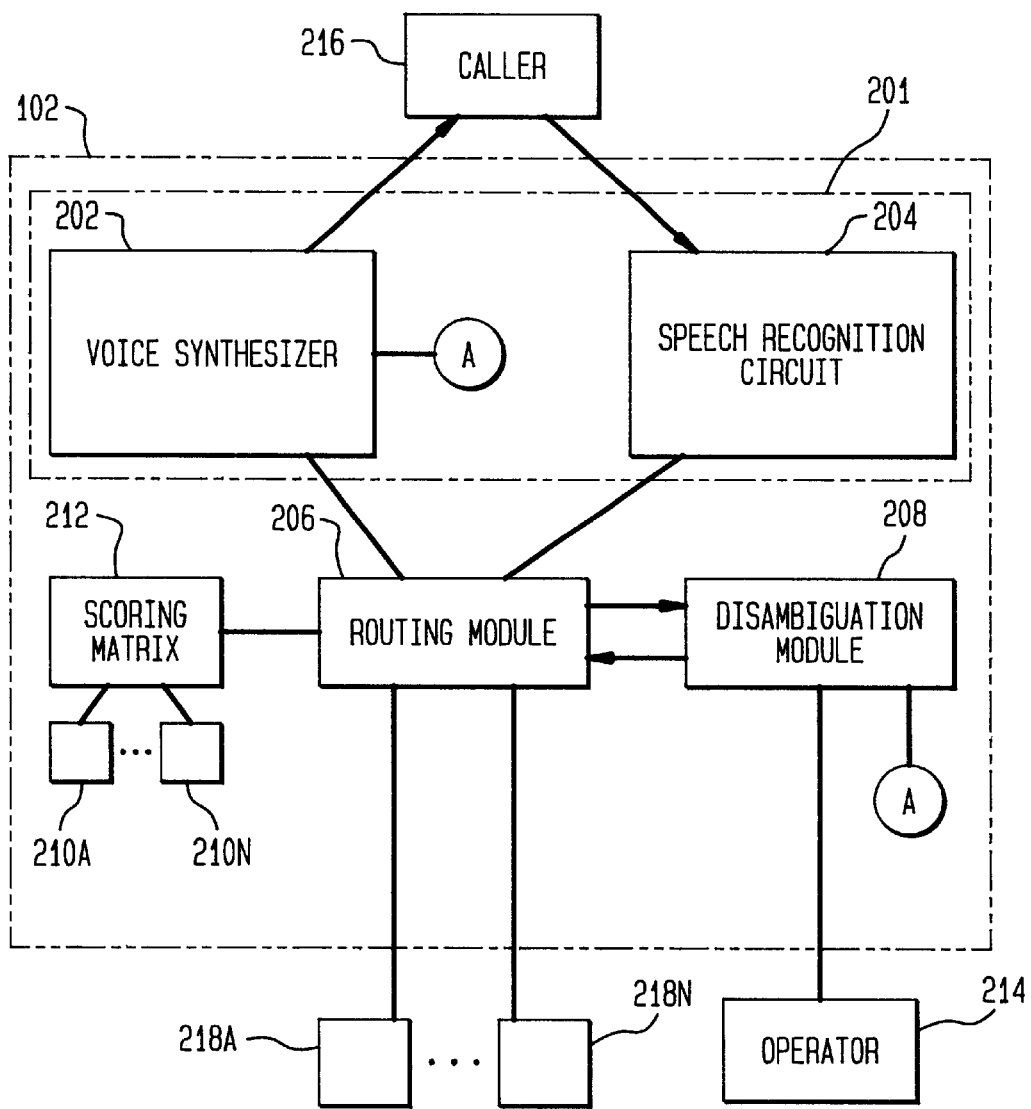
FIG. 2 illustrates a call routing system according to the present invention.

FIG. 2 is a diagram illustrating in greater detail the call routing system 102 shown in FIG. 1. The routing system 102 includes a caller interface 201 for conveying information to the customer and retrieving information provided by the caller for use in routing the call. The caller interface 201 preferably includes a voice synthesizer 202 and a voice recognition unit 204. The call routing system 102 also includes a routing module 206 and a disambiguation module 208. The routing module matches information received from the caller interface 201 against one of a plurality of documents 210A . . . N using information contained in a scoring matrix 212. The documents 210A . . . N and the scoring matrix 212 are created by a training system described in further detail in connection with the discussion of FIG. 3. The routing module 206 is described in further detail in connection with the discussion of FIG. 4. The routing module 206 and the disambiguation module 208 are capable of routing calls to a human operator 214 under appropriate circumstances.

The routing system 102 receives calls from a caller 216 and provides information and poses questions to the caller 216 using voice prompts produced by the voice synthesizer 202. The caller 216 provides voice responses, which are received and converted to text by the voice recognition unit 204. The voice recognition unit 204 passes the text to the routing module 206, which attempts to appropriately route the call to one of a plurality of possible destinations 218A . . . N, based on analysis of the text received from the voice recognition unit 204. The routing module generates a set of candidate destinations which is a subset of the possible destinations 218A . . . N. If the routing module 206 is unable to generate a set of candidate destinations, the routing module 206 passes the call to the human operator 214. If the routing module 206 is able to generate a set of candidate destinations, but is unable to reduce the set to a single unique destination, the routing module passes the call to the disambiguation module 208. The disambiguation module 208 further disambiguates the candidate destinations by creating disambiguating questions for the caller 216 and using the responses of the caller 216 to further distinguish between the candidate destinations.

Figure 3:
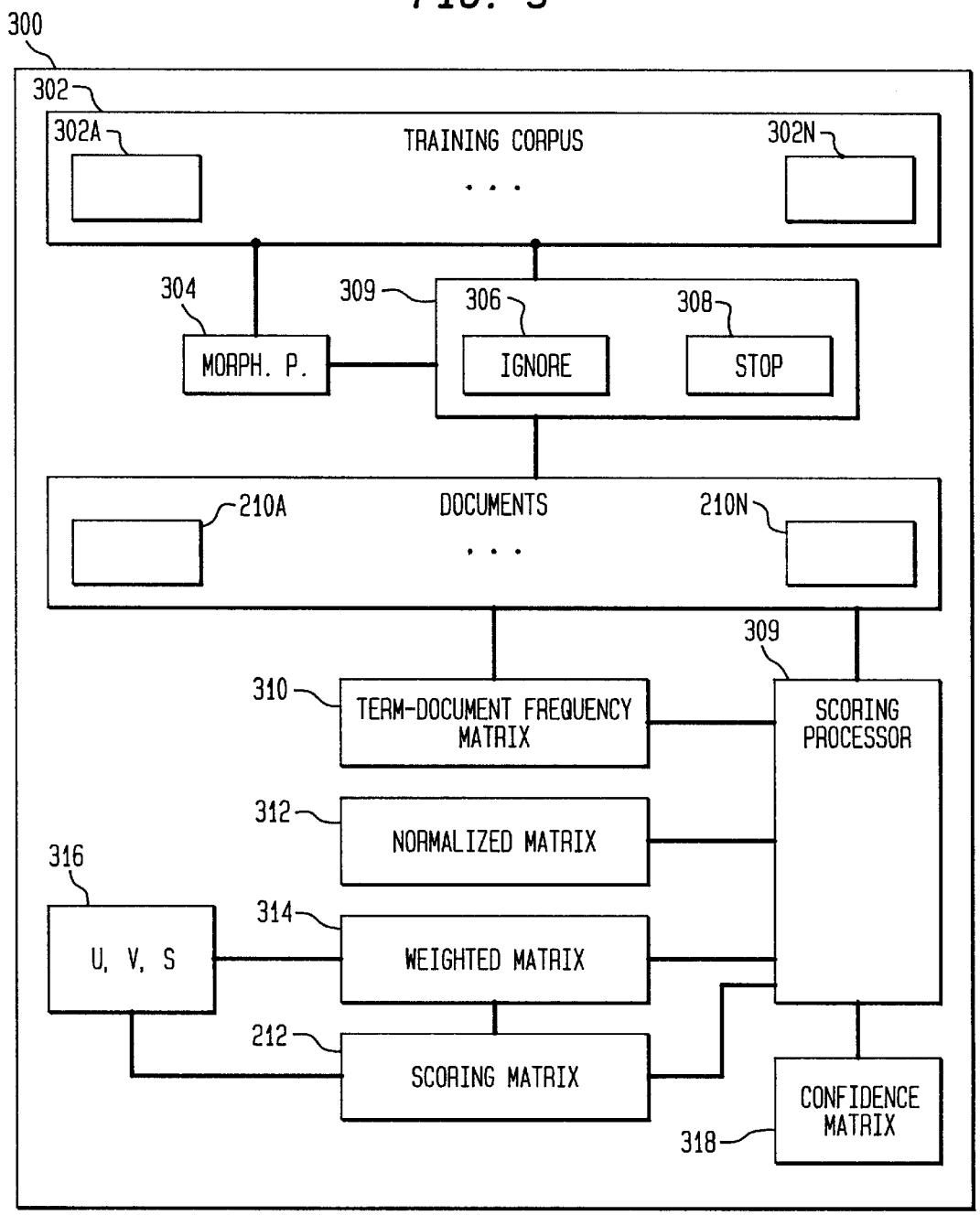
FIG. 3 illustrates a training system according to the present invention for training the call routing system illustrated in FIG. 2.

FIG. 3 illustrates a training system 300 which is used to create the documents 210A . . . N used in the routing module 206 illustrated in FIG. 2. The training system is provided with a training corpus 302. The training corpus 302 is created by receiving a plurality of calls, routing each call to a destination via a human operator, and saving the text of the caller's contribution to each call in a training document 302A . . . N associated with the destination to which the call is routed.

Each of the training documents 302A . . . N is filtered through a morphological processor 304, which extracts the root form of each word of the document. Next, the root forms of caller utterances are filtered through two lists, an ignore list 306 and a stop list 308 stored in memory 309.

The ignore list 306 contains 'noise words', which are words which do not represent an articulate utterance and are to be simply filtered out. An example of a response containing a noise word is 'I'd like to speak to someone about a car, uh, loan.' The noise word 'uh' is filtered out, allowing extraction of the two-word term or bigram 'car loan.' The stop list 308 filters out common function words that are irrelevant for a routing task. Which words appear on the stop list will depend on the application, but typically such words will be function words such as 'the' and 'is'. Unlike the ignore filter 306, the stop filter 308 inserts placeholders in place of words on the stop list 308. Thus, the phrase 'I want to check on an account' becomes <sw> <sw> <sw> check <sw> <sw> account.' Without the placeholders, the bigram 'check, account' would be extracted, just as if the caller had used the term 'checking account.'

After filtering is completed, the result of filtering each of the training documents 302A . . . N is converted to a corresponding document 210A . . . N in the routing module 206. Information contained in the documents 210A . . . N is used to create the scoring matrix 212 which is used by the routing module 206 to identify a destination for each call, as will be described in greater detail in connection with the discussion of FIG. 4 below. Each of the documents 210A . . . 210N is a bag or collection of terms associated with a particular destination. A term is a single or multiple-word utterance which has relevance to the routing function.

The training system 300 further employs a scoring processor 309 to create the scoring matrix 212 shown in FIG. 2 above. The first step in creating the scoring matrix 212 is the creation of a term-document frequency matrix 310. The term-document frequency matrix 310 is preferably an m×n matrix, whose rows represent the m terms, whose columns represent the n destinations, and where an entry $A_{t,d}$ is the frequency with which term t occurs in calls to destination d. The term-document frequency matrix 310 forms a basis for associating a query with one of the documents 210A . . . N.

A caller's response is preferably associated with a document 210A . . . N based on the assumption that if a term occurred frequently with a given destination in the training corpus 302, then an occurrence of that term in a caller's response indicates that the call should be routed to that destination.

If the term-document frequency matrix 310 is designated A, and has m terms ind n destinations, then an element $a_{t,d}$ of the matrix A for $1 \leq t \leq m$ and $1 \leq d \leq n$ represents the number of times the term t occurred in calls to the destination d. This is the underlying score attached to a term-document pair.

Row t in the matrix can be thought of as an n-dimensional vector representing the term t. A column d in the matrix is an n-dimensional vector representing the document d. The dimensionality of the term vector is the number of destinations and the dimensionality of the destination vector is the number of terms.

In vector-based information retrieval systems, the product of vector representations of terms and documents yields a measure of their similarity. For instance, two documents d and e may be compared by computing the product of the dth and eth columns of the matrix.

Most vector-based information retrieval systems normalize the result of such vector products by the lengths of the input vectors. In other words, they compute the cosine of the angle between the two vectors. The length of a vector $x=<x_1, \ldots, x_n>$ is given by:

$$\|x\|=(x \bullet x^T)^{1/2}=(\Sigma_{1 \leq i \leq n} X_i^2)^{1/2}$$

The cosine between two vectors x and y is given by:

$$\cos(x,y)=(x \bullet y^T)/(\|x\| \bullet \|y\|)^{1/2}$$

Using cosines reduces the contribution of each vector to its angle by normalizing for length. As a result, arbitrary scaling by a constant is simply divided back out again during the length calculation. Thus the key in maximizing the cosine between two vectors is to have them pointing in the same direction. This happens when their components are scaled in the same proportion. The cosine metric gives values within the range −1 to 1. It may be convenient to make design choices which further restrict the values. For example, if the components of all the vectors are positive, as they are with the raw frequency counts of the usage of a term, for instance, then all values are within the range 0 to 1.

A caller's query often involves more than one term, some of which may occur in more than one document. Thus, the scoring processor 309 preferably performs weighting of the term-document frequency matrix 310 in order to provide an accurate match for terms which may be contained in more than one document. The traditional method of combining query terms in vector-based information retrieval applications is simply to take the sum of their individual vector representations, and often to normalize the resulting length to one. This is the vector analog of averaging in ordinary weightings. The scores for each destination can then simply be read off this vector in order to perform matching.

In call routing, simple averaging is inappropriate, as it gives too much weight to terms that are very frequent. In order to combat this problem, the term-frequency matrix 310 is normalized so that every term representation is of the same length as a vector. The scoring processor 309 then preferably creates a normalized matrix 312 by dividing every row at of the term-document frequency matrix 310 by its length. If the normalized matrix 312 is matrix B, the elements of the matrix 312 are as follows:

$$b_{t,d}=a_{t,d}/\|a_t\|$$

The scoring processor 309 preferably further weights the entries in the normalized matrix 312 by giving greater weight to a term that occurs in only a few of the documents 210A . . . N than is given to a term which occurs in many of the documents 210A . . . N. For instance, in calls to a banking center, the term 'need' will occur in many documents, while 'stop payment' will not. Thus, the second term should be given more weight in the request 'I need to stop payment on a check'. The scoring processor 309 thus applies an inverse-document frequency weighting factor to the normalized matrix 312, weighting each term inversely to the number of documents in which it occurs. A preferred exemplary formula for computation of the inverse-document weighting factor is given by:

$$IDF(t)=\log_2(n/Nd(t)),$$

where t is a term, n is the number of documents in the corpus, and Nd(t) is the number of documents containing the term t. If t occurs in only one document, then Nd(t) is equal to 1 and it follows that $IDF(t)=\log_2 n$; if t occurs in every document, then Nd(t) is equal to n, and therefore (n/Nd(t)) is equal to 1. It then follows that $IDF(t)=\log_2 1$, which is equal to 0. Terms that occur in every document can thus be eliminated under this weighting scheme. An alternative in which no terms would disappear would be to add 1 to the number of documents in the numerator. The scoring processor 309 creates a weighted matrix 314 by multiplying each row t by IDF(t) to arrive at the matrix 314. If the weighted matrix 314 is referred to as matrix C, the contents of the weighted matrix 314 are:

$$c_{t,d}=IDF(t) \bullet b_{t,d}$$

The weighted matrix 314 developed by the training system 300 is then copied to the scoring matrix 212, used by the routing module 206 illustrated in FIG. 2.

In order to reduce the size of the documents 210A . . . N and to provide a uniform representation of terms and documents, a singular-value decomposition is preferably applied to the weighted matrix 314 to produce the matrix set 316 which includes matrices U, V, and S. described in further detail below. If the weighted matrix is referred to as C, then:

$C=U \bullet S \bullet V^T$ where U is an m×m orthonormal matrix, V is an n×n orthonormat matrix, and S is an m×n positive matrix whose nonzero values are $s_{1,1}, \ldots, s_{r,r}$, where r is the rank of C, and the values are arranged in descending order $s_{1,1} \geq s_{2,2} \geq \ldots \geq S_{r,r} > 0$.

For an orthonormal matrix, the rows are all unit length and pairwise orthogonal. $S^{1/2}$ is the result of taking the square root of the values in S. The following representations can then be used:

Term vectors: $U \bullet S^{1/2}$

Document vectors: $V \bullet S^{1/2}$

The names for these representations derive from the fact that a term/document score $C_{t,d}$ in the weighted term-document matrix 314 is given by multiplying row t of $U \bullet S^{1/2}$ by the transpose of row d of $V \bullet S^{1/2}$. This is because:

$$C=(U \bullet S^{1/2}) \bullet (V \bullet S^{1/2})^T$$

In order to assign a raw score to a document pair, the cosine of the representative vectors are used:

$$\text{Score}(d_1, d_2)=\cos((V \bullet S^{1/2})_{d_1} \bullet (V \bullet S^{1/2})_{d_2})$$

As previously mentioned, using a cosine assures a result between −1 and 1. Normalizing via cosine value makes confidence fitting easier.

To compare a sequence of terms with a document, the scoring processor 309 takes a weighted centroid of the vectors representing each of the terms:

$$\text{RawScore}(\{t_1, \ldots, t_n\}, d)=\cos(Wgt(t_1) \times (U \bullet S^{1/2})_{t1}+ \ldots +Wgt(t_i) \times (U \bullet S^{1/2})_{ti}, (V \bullet S^{1/2})_d)$$

In combining terms, trigrams are weighted more than bigrams, which in turn are weighted higher than unigrams. An exemplary weighting is given by:

Wgt(t)=1 if t is a unigram, 2 if t is a bigram, and 4 if t is a trigram.

For disambiguation, it is important to note that the term-term and document-document vector comparisons can also be recovered using this method. An exemplary case is that of comparing term vectors to term vectors. An example matrix $T=C \bullet C^T$ may be said to contain entries $T_{ij}=C_i \bullet C_j^T$ corresponding to all pairwise vector products. These can be recovered using term vectors and singular values as follows:

$$C \cdot C^T = (U \cdot S \cdot V) \cdot (U \cdot S \cdot V)^T$$
$$= U \cdot S \cdot V \cdot V^T) \cdot S^T \cdot U^T$$
$$= U \cdot S \cdot S^T \cdot U^T$$
$$= (U \cdot S) \cdot (U \cdot S)^T$$

If all rows are normalized to unit length before $C \cdot C^T$ is computed, then $C \cdot C^T$ will contain the cosine scores between all the vectors.

When terms are compared to terms, terms may be represented as vectors drawn from rows of U•S. When terms are compared to documents, terms may be represented as vectors drawn from rows of $U \cdot S^{1/2}$.

It is also possible to compare documents to documents. By symmetry to the above comparisons, document-document scores may be found in $D=C^T \cdot C$. As with short-term comparisons, the values in the document-document comparison matrix represent products of the corresponding columns in the term-document matrix. Paralleling the above derivation for the terms yields the equation:

$$C^T \cdot C = (V \cdot S) \cdot (V \cdot S)^T.$$

The matrices U, V, and S derived from the weighted matrix 314 thus provide significant additional information which can be used in evaluating a query. Upon generation of the equivalent matrix 316, the scoring processor 309 stores the equivalent matrix 316 in the scoring matrix 212.

The training system 300 also produces a set of confidence data 318 for each call in the training data, using a routing value of 1 if a call should be routed to a particular destination and 0 otherwise. For each destination, the training system 300 may advantageously use the least-squared error method in fitting a sigmoid function, $1/(1+e^{-(ax+b)})$ to the set of cosine routing pairs to produce a confidence matrix 318. The reason for mapping from cosine scores to confidence scores is that the absolute degree of similarity between a request and a destination, as given by the cosine value between their vector representations, does not translate directly into the likelihood for correct routing. Instead, some destinations may require a higher cosine value or a higher degree of similarity than others in order for a request to be correctly associated with that destination.

Figure 4:
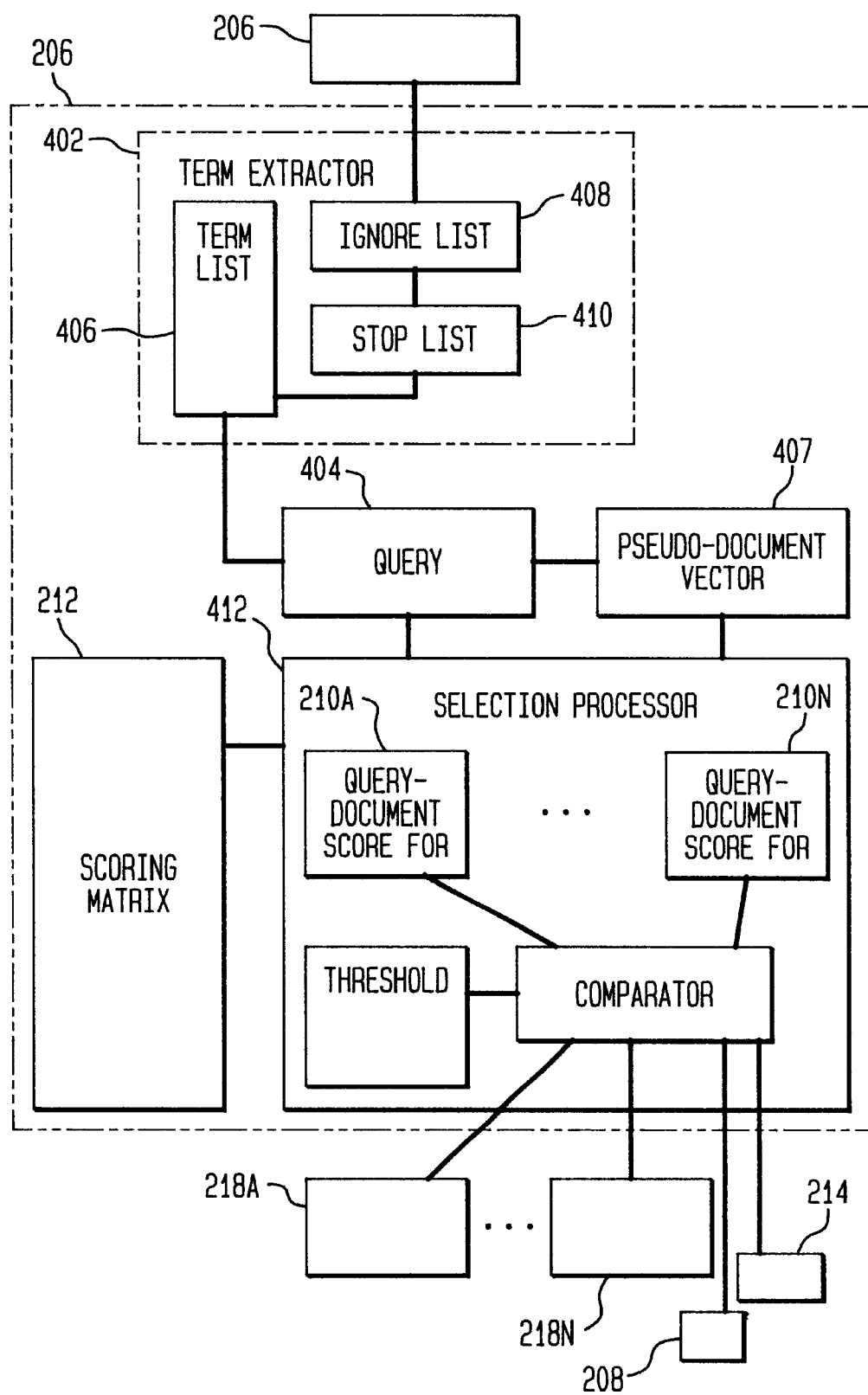
FIG. 4 illustrates a routing module for use in a call routing system according to the present invention.

FIG. 4 is a more detailed illustration of the routing module 206 illustrated in FIG. 2. The routing module 206 includes a term extractor 402. The term extractor 402 receives text generated by the automated voice recognition system from the caller's voice responses, and extracts relevant terms from the text. The terms are organized to form a query 404, which is used to match the caller's response to one of the set of documents 210A . . . 210N using information contained in the scoring matrix 212.

Each of the documents 210A . . . 210N is a bag or collection of terms associated with a particular destination. A term is a single or multiple-word utterance which has relevance to the routing function. Each of the documents 210A . . . N includes all terms in calls which were routed to the associated destination during formation of the documents 210A . . . N by the training system described in connection with the discussion of FIG. 3. Each of the documents 210A . . . N, and the query 404, consists simply of a bag of terms, without considering syntactical structure or true information content, but simply the occurrence of terms within the document or the query. The assumption in a bag of terms model is that if a term occurred frequently with a given destination during the training phase, then the occurrence of that term in the caller's responses indicates that the call should be routed to that destination.

Each of the terms extracted from the caller's voice responses by the term extractor 402 is preferably a term encountered during operation of the training system 300. That is, the term extractor 402 preferably restricts its selection of words and phrases used in formation of the query 404 to those encountered by the training system. Eligible words and phrases may be maintained in an eligible term list 406. Only words and phrases appearing in the term list 406 may be used in the query 404.

Terms consist of single or multiple-word utterances that have relevance to the call destination. The terms extracted from the caller's responses are terms which have been selected during a training phase. Details of the selection of terms will be further described below. The term extractor performs morphological processing on each term to extract the root form of the term. The term is then subjected to further filtering.

Terms consist of n-grams. An n-gram is a phrase or sentence consisting of n words. By way of illustration, 'check' is a unigram, 'checking account' is a bigram, and 'auto loan application' is a trigram. In order to insure that the extracted terms are useful for the call routing task, the term extractor 402 performs filtering operations on the text received from the automated voice recognition circuit against words on an ignore list 408 and a stop list 410. Words appearing on the noise list are removed altogether, while words appearing on the stop list are replaced by stops.

The term extractor 402 forms the terms collected from a call into the query 404. The query 404 may be represented by a vector Q, where each component $q_i$ represents a number of times that the ith term occurred in the caller's request. The query 404 is then used to create a pseudo-document vector 407. The pseudo-document vector 407 can be represented as D=QU, following the standard methodology of vector-based information retrieval. D is simply the sum of the term vectors $U_i$ for all terms occurring in the caller's request, weighted by their frequency of occurrence in the request, and scaled properly for document/document comparison. The pseudo-document vector 407 is then used for matching to one of the documents 210A . . . N. In order to perform the selection, the routing module 206 employs a selection processor 412, which computes the cosine between D and each of the documents 210A . . . N. In order to compute the cosine between D and each of the documents, the selection processor 412 retrieves scoring information relating for each document from the scoring matrix 212 whose creation is described above in connection with the discussion of FIG. 2. Next, the cosine score for each of the documents 210A . . . N is transformed using a sigmoid function specifically fitted for the document 210A . . . N to produce a query-document score which represents the confidence of the selection processor 412 that the pseudo-document 407 matches the scoring information associated with the document 210A . . . N. The scoring information for each of the documents 210A . . . N is found in the scoring matrix 212. The selection processor 412 compares the query-document score for each of the documents against a threshold. If the query-document score meets or exceeds the threshold for exactly one document, the routing module routes the call to the destination associated with the document whose score meets the threshold. If the query-document score meets the threshold for more than one document, the query is ambiguous, and the call is transferred to the disambiguation module 208. If no document has a score meeting the threshold, the call is transferred to a human operator 214.

FIG. 5 illustrates in greater detail the disambiguation module 208 shown in FIG. 2. The disambiguation module 208 greatly adds to the usefulness of the routing system 200 shown in FIG. 2, as not every call received by a call center is phrased in such a way that it can be unambiguously routed to a particular destination. The main stumbling block to less ambiguous responses is that the caller does not know how the call center is organized. In an effort to provide enough information to be routed, but not so much as to waste time, callers often provide too little information. For instance, a department store may have several departments matching the phrase 'Could I have the women's clothing department', including casual clothing, designer clothing, swimwear, and so on. Typically, a human operator will ask a follow-up question in such cases. The phrasing of the question may depend on the distribution of calls. For instance, if 95% of the calls for women's clothing are for casuals, an appropriate follow-up question might be 'casuals?'

The disambiguation module 208 is employed to assist in directing a call when the query 404 shown in FIG. 4 results in a score above a specified threshold for more than one of the documents 210A . . . N. The ambiguity module 208 employs a natural dialog similar to that employed by a human operator, asking follow-up questions of a caller in order to clarify the caller's intentions. The ambiguity module 208 includes a disambiguating question generator 502 which preferably generates questions which are easy for the customer to answer and the answers to which are easy to comprehend in the sense of translating them into routing decisions.

The disambiguation module 208 receives the query 404 and the pseudo-document vector 407 from the routing module 206, along with identities of the documents within the set of documents 210A . . . N which exceed the threshold. The query and the identities of the documents are passed to the question generator 502, which creates disambiguating questions using terms that are close, relevant, and disambiguating with respect to the documents. The question generator employs a term selector 504, which has access to the content of the documents 210A . . . N in order to find and select appropriate terms.

In order to determine closeness, the term selector 504 compares the pseudo-document vector 407 with the documents. This is preferably done by subtraction. For example, if the pseudo-document vector 407 is labeled q, and two documents must be distinguished, labeled d1 and d2, the term selector 504 prepares a first difference vector v1 for the first document and a second difference vector v2 for the second document. The first difference vector is given by v1=q–d1 and the second difference vector is given by v2=q–d2. This represents the 'difference' between the target destinations and the pseudo-document vector 407. The term selector 504 selects terms which are close to these difference vectors in their cosine measure. The close terms represented by the selected term vectors are those which, when added to the original query, are likely to allow the disambiguating module to select one document over the other.

The term selector chooses relevant terms which either overlap with a term in the query 404, or which can be combined with a term in the query 404 to form a new term. Thus, if the term 'loan' is in the query 404, the term 'car' would be relevant if 'car loan' (or 'loan car') were terms in the training corpus. Similarly, 'new car' in the query 404 would mean that 'car loan' is a relevant term. The term selector 504 analyzes possible compounds that can be formed of the query terms and the relevant terms. For a query term 'new car', and the close terms 'flat tire' and 'car loan', only the latter would be relevant if 'new car loan' were a valid term and 'new car flat tire' was not. The term selector 504 thus forms a new query using the resulting compound, combining 'new car' and 'car loan' to form the valid term 'new car loan'.

Finally, the term selector 504 chooses from the set of compounds formed from the relevant terms those which, when added to the query 404, result in an unambiguous routing. An unambiguous routing is a routing having only one of the documents 210A . . . N which exceeds a threshold score. For example, given the query 'car loan', if 'new car' is close and relevant, the term 'new car loan' would be disambiguating if the query 'car loan, new car loan' would be routed unambiguously.

The question generator 502 examines the terms selected by the term selector 504 to determine an appropriate question. If the selected terms share a common headword (salient content word, for example, 'loan' in the term 'auto loan') the question generator forms the disambiguating question 'What type of loan?' The question is relayed to the caller and the response passed to a refined query module 506. The refined query module 506 combines the caller's response with the original query 404 used to create a new query which is passed to the routing module 206. If the call is still unable to be routed after the question has been answered, the routing module 206 may pass the call back to the disambiguation module 208 to prepare an additional question for the caller, but the number of repetitions of disambiguating questions is preferably limited to a predetermined number, and once the number is reached the call is then preferably routed to a human operator.

If the selected terms do not share a common headword, the question generator 502 receives an appropriate term from the term selector 504 and forms a yes-no question based on this term. The criteria used to select such a term are based on the assumption that since the n-gram terms in the user's original query are ambiguous, relevant terms which further specify these n-gram terms are more likely to help disambiguate the query than are other terms. Thus, the term selector 504 selects from the relevant terms those that contain an n-gram term in the original query, such as 'new car loan' containing the query term 'car loan', or those that can be combined with a query term to form a meaningful term, such as 'new loan' and the query term 'car loan' forming a meaningful term 'new car loan'. If either of these selection processes results in more than one term being selected, the term selector 504 simply selects the term that occurred most frequently in the training data, based on the assumption that a common term is more likely to be relevant to the current query than is an obscure term. If the original query 404 is 'car loans', for example, the question produced may be 'Would that be new car loans?' If the response is affirmative (if, for example, the answer is 'yes,' 'okay', 'yeah', 'uh-huh', or one of a number of alternative affirmative responses) the indicated term is passed to the refined query module 506 for use in constructing a new query which is then passed to the routing module 206. If the response is a simple negative (if, for example, the answer is 'no', 'uh-uh', 'nope', or one of a number of alternative negative responses) another candidate term is selected and a new 'yes-no' question posed to the caller. Frequently, however, a caller who answers a yes-no question in the negative will add additional details to the answer. If such details are received by the refined query module 506, the refined query module 506 adds the additional details to the original query to form a new query and passes the call to the routing module 206. The number of additional 'yes-no' questions which may be asked is preferably limited to a predetermined number, and once this number is exceeded the call is preferably routed to a human operator.

As alternative to a simple 'yes-no' question, the question generator may, when confidence is high that one of two destinations is intended, form a question calling for selection of one of the destinations. For example, 'Auto loans or mortgage loans?' In that case, the response would be employed by the refined query module 506 to construct a new query employing the chosen additional term or, alternatively, the refined query module could simply pass the call to the routing module 206 with direction to route the call to the selected destination.

Figure 6A:
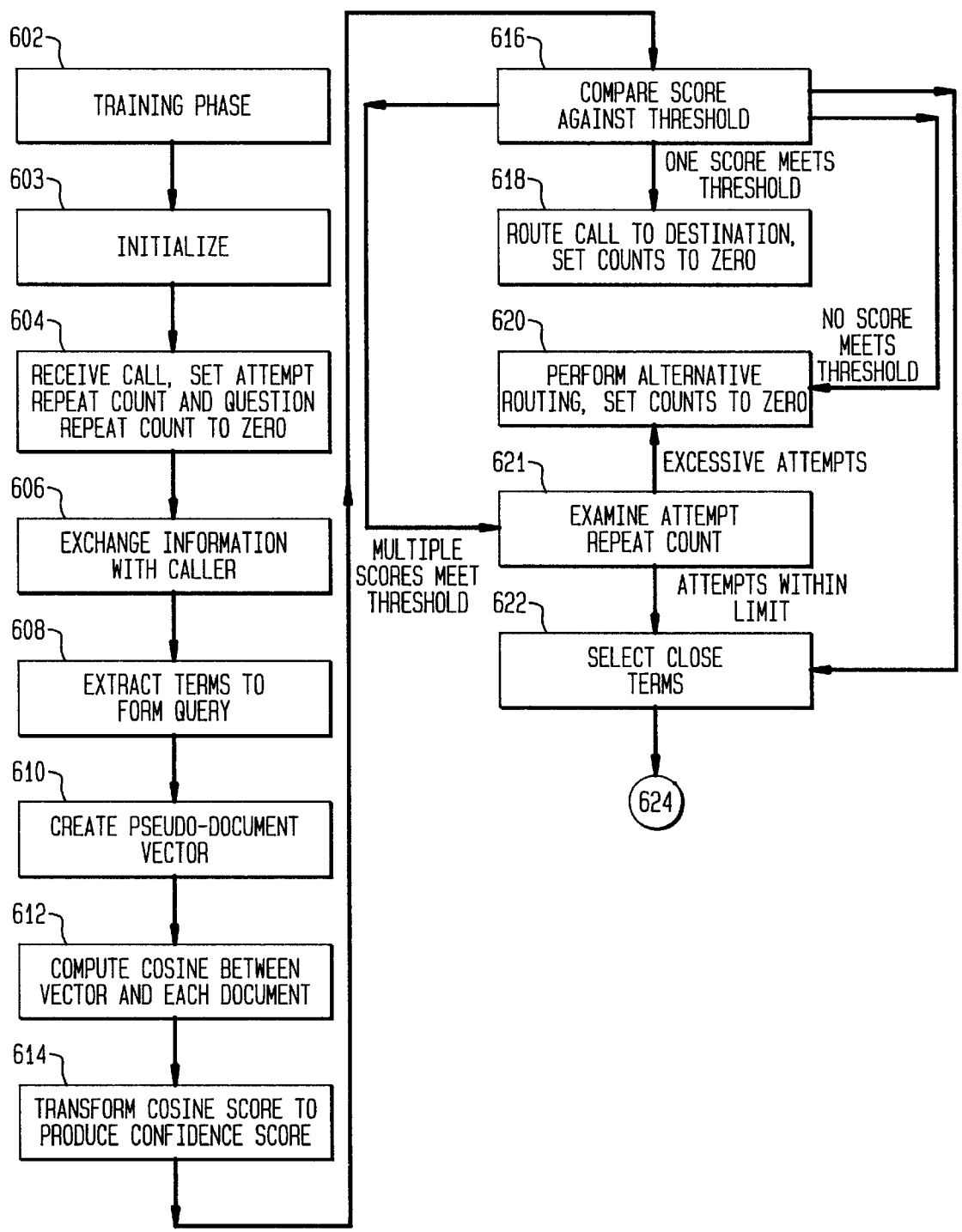
FIG. 6 illustrates a method of call routing according to the present invention.
Figure 6B:
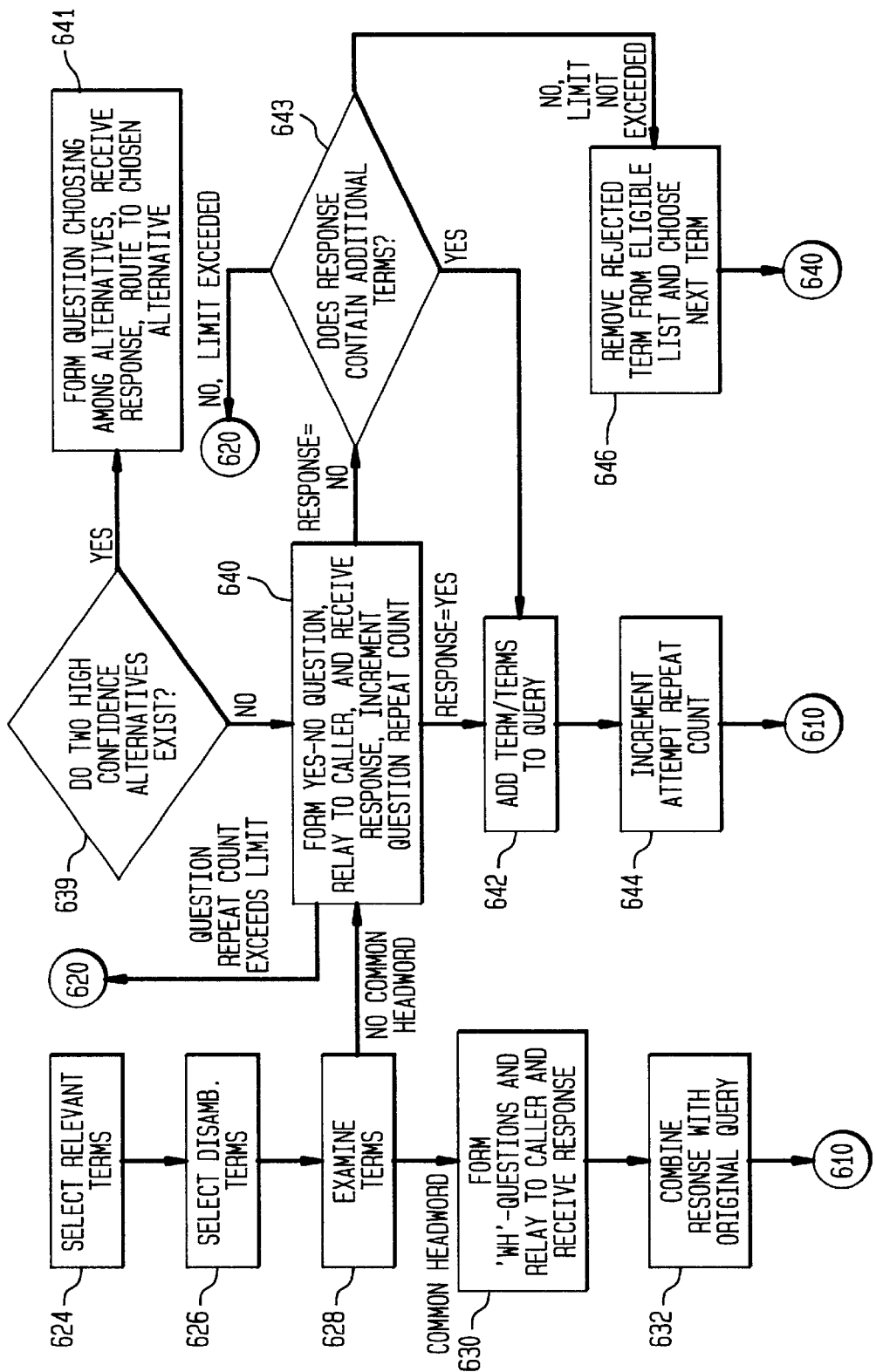

FIG. 6 is a flowchart illustrating a method 600 of call routing according to the present invention. At step 602, a training phase is executed to create a document associated with each destination and to create a scoring matrix for selecting a document. Details of the training phase will be illustrated in greater detail in FIG. 7 below. Step 602 may be executed only so often as it is desired to train the system. The subsequent steps are preferably executed at every call.

At step 603 initialization occurs. A question repeat count value and an attempt repeat count value are set to zero. These values are used to determine when an excessive number of disambiguating questions have been posed to a caller. Their use will be discussed more fully in connection with the discussion of subsequent steps. Limits for the question repeat count and attempt repeat count are also set. At step 604, a call is received. At step 606, information is exchanged with the caller, typically by means of questions posed to the caller and responses received from the caller. At step 608, terms are extracted from the responses to form a query. At step 610, the query is used to create a pseudo-document vector D. The pseudo-document vector is then used for matching to one of the documents. In order to perform the selection, the cosine between D and each of the documents is computed at step 612. Next, at step 614, the cosine score for each of the documents is transformed using a sigmoid function specifically fitted for the document to produce a query-document score which represents the confidence that the pseudo-document matches that document. At step 616, the query-document score for each of the documents is compared against a threshold. If the query-document score meets or exceeds the threshold for exactly one document, control is passed to step 618 and the call is routed to the destination associated with the document whose score meets the threshold. If no document has a score meeting the threshold, control is passed to step 620 and the call is routed by alternative means. For example, the call may be routed to a human operator, or may be transferred to a conventional voice menu system. The attempt repeat count and the question repeat count are also set to zero. If the query-document score meets the threshold for more than one document, the query is ambiguous. Control is passed to step 621 and the attempt repeat count is examined to determine if an excessive number of attempts have been made. If the attempt repeat count is within limits, control is passed to step 622. If the attempt repeat count is not within limits, control is passed to step 620 and the call is routed by alternative means and the counts are set to zero.

In order to create disambiguating questions, terms must be selected which are close, relevant, and disambiguating. At step 622, terms are selected which are close with respect to the documents. At step 624, relevant terms are selected from among the close terms collected in step 622. At step 626, relevant terms are chosen from the set of compounds formed which, when added to the query, result in an unambiguous routing.

At step 628, the selected terms are examined to determine an appropriate question. If the selected terms share a common headword, control is passed to step 630 and a 'wh'-question is formed and relayed to the caller and the caller's response received. Next, control is passed to step 632 and the caller's response is combined with the original query to create a new query. Control is then passed to step 610 and another attempt at routing is made.

If the selected terms do not share a common headword, control is passed to step 639 and the selected terms and their scores are examined to determine if two high-confidence alternatives exist such that there is a high likelihood that one of the two alternatives defines the desired destination. If two high-confidence alternatives do exist, control is passed to step 641 a question is form allowing a choice among the alternatives, the response is received, and the call is routed to the selected alternative. Otherwise, control is passed to step 640 and a yes-no question is formed based on an appropriate term from among those collected at step 626. Control is also passed to step 640 if a negative response is received to the alternative choices presented at step 639. At step 640, the question repeat count is also incremented. The question is relayed to the caller and the answer is received. If the answer is affirmative, control is passed to step 642 and the indicated query is used to create a new query. Control is then passed to step 610 and another attempt at routing is made. If the answer is negative, control is passed to step 643 and the response examined for the presence of additional terms which may have been volunteered by the caller as part of the response. If additional terms exist, control is passed to step 642. If no additional terms exist and the question repeat count is not excessive, control is passed to step 646 and the term is removed from the list of eligible terms and control is returned to step 640 for selection of another candidate term to be used in a new 'yes-no' question to the caller. If no additional terms exist and the question repeat count does exceed the predetermined limit, control is passed to step 620.

FIG. 7 is a flowchart illustrating in greater detail the training step 602 discussed above in connection with FIG. 6. The training step 602 includes a number of subordinate steps which are discussed in detail immediately below. At step 702 a training corpus is created by receiving a plurality of calls, routing each call to a destination via a human operator, and saving the text of the caller's contribution to each call in a training document associated with the destination to which the call is routed. The text may be saved automatically with a speech recognition module, may be transcribed by a human, or may be saved in any other desirable way.

At step 704, each of the training documents is subjected to morphological processing that extracts the root form of each word of the document. Next, at step 706, the root forms of caller utterances are filtered through two lists, an ignore list and a stop list. 'Noise words' found on the ignore list, for example, words which do not represent an articulate utterance, are simply filtered out. An example of a response containing a noise word is 'I'd like to speak to someone about a car, uh, loan.' The noise word 'uh' is filtered out, allowing extraction of the bigram 'car loan.' The stop list provides a list of common function words that are irrelevant for a routing task. Which words appear on the stop list will depend on the application, but typically such words will be function words such as 'the' and 'is'. Unlike noise words, words on the stop list will interrupt 'n-grams'. That is, the presence of a stop word in a phrase will prevent the phrase from being recognized as an n-gram. Thus, if the word 'the' is on the stop list, the term extractor will not extract the bigram 'check balance' from the utterance 'check the balance in my savings account.'

After filtering is completed, control is transferred to step 708 and the result of filtering each of the training documents is converted to a corresponding document to be used for routing calls. As discussed above in connection with the discussion of FIG. 6, each of the documents thus created is used by the destination for each call.

Next, at step 710, a term-document frequency matrix is created. A caller's query often involves more than one term, some of which may occur in more than one document. Control is therefore passed to step 712 and the term-document frequency matrix is weighted in order to provide an accurate match for terms which may be contained in more than one document. The traditional method of combining query terms in vector-based information retrieval applications is simply to take the sum of their individual vector representations (and often to normalize the resulting length to one). This is the vector analogue of averaging in ordinary weightings. The scores for each destination can then simply be read off this vector in order to perform matching.

In call routing, simple averaging is inappropriate, as it gives too much weight to terms that are very frequent. In order to combat this problem, the term-frequency matrix is normalized so that every term representation is of the same length as a vector. A normalized matrix is thus created by dividing every row at of the term-document frequency matrix by its length.

At step 714, the weighted matrix developed by the training system is copied to a scoring matrix, used by the routing method discussed above in connection with FIG. 6.

Additional matrices are useful in providing additional information for the routing function. Therefore, at step 716, a singular-value decomposition is preferably applied to the weighted matrix to produce an equivalent matrix set which includes matrices U, V, and S, in order to reduce the size of the documents and to provide a uniform representation of terms and documents. If the weighted matrix is referred to as C, then:

$C = U \cdot S \cdot V^T$ where U is an m×m orthonormal matrix, V is an n×n orthonormal matrix, and S is an m×n positive matrix whose nonzero values are $S_{1,1}, \ldots, S_{r,r}$, where r is the rank of C, and the values are arranged in descending order $s_{1,1} \geq s_{2,2} \geq \ldots S_{r,r} > 0$.

The matrices U, V, and S derived from the weighted matrix and stored as the equivalent matrix provide significant additional information which can be used in evaluating a query. At step 718, upon generation of the equivalent matrix, the equivalent matrix is stored in the scoring matrix.

At step 720, a set of confidence data is created for each call in the training data, using a routing value of 1 if a call should be routed to a particular destination and 0 otherwise. For each destination, the least-squared error method is used in fitting a sigmoid function, $1/(1+e^{-(ax+b)})$ to the set of cosine routing pairs to produce the confidence matrix. The reason for mapping from cosine scores to confidence scores is that the absolute degree of similarity between a request and a destination, as given by the cosine value between their vector representations, does not translate directly into the likelihood for correct routing. Instead, some destinations may require a higher cosine value (that is, a higher degree of similarity) than others in order for a request to be correctly associated with that destination.

While the present invention is disclosed in the context of a presently preferred embodiment, it will be recognized that a wide variety of implementations may be employed by persons of ordinary skill in the art consistent with the above discussion and the claims which follow below.

We claim:

1. A call routing system for routing a call to a desired destination, comprising:

a caller interface for conveying information to a caller and receiving caller information from the caller for use in routing of a call;

a routing module for routing a call to a desired destination based on caller information received by the caller interface, the routing module being operative to formulate a query based on terms contained within the caller information, the routing module being further operative to determine a match between the query and one of a plurality of documents, each of the plurality of documents being associated with a destination, the routing module being operative to route the call to the destination associated with the document matching the query, the routing module being further operative to detect ambiguity in the match between the query and the one of the plurality of documents;

a disambiguation module for disambiguating an ambiguous match between the query and one of the plurality of documents, the disambiguation module being operative to create one or more disambiguating questions to be provided to the caller through the caller interface, the disambiguation module being further operative to receive an answer to the disambiguating questions from the caller interface, the disambiguation module being operative to add information from the answer to the disambiguating questions to the query to produce a refined query, the disambiguation module being further operative to return the refined query to the routing module for use by the routing module in routing the call; and a training system for creating the plurality of documents, the training system being operative to receive a plurality of calls and store caller contributions to each call, each call being routed to a destination by a human operator, the training system being operative to create the plurality of documents by storing in each document associated with each of the destinations all terms of each call routed to the destination.

2. The call routing system of claim 1 wherein the training system is operative to create a training corpus by receiving a plurality of calls, routing each call to a destination via a human operator, and saving the text of the caller's contribution of each call in a training document associated with the destination to which the call is routed.

3. The call routing system of claim 2 wherein the training system is further operative to filter each training document through a morphological processor to extract a root form of each word in the training document.

4. The call routing system of claim 3 wherein each of the root forms is filtered through an ignore list and a stop list, each root form appearing on the ignore list being removed, each root form on the stop list being replaced by a stop.

5. The call routing system of claim 4 wherein the training system is further operative to convert a result of filtering each training document to a routing document for use by the routing module.

6. The call routing system of claim 5 wherein the training system is further operative to create a term-document frequency matrix including a plurality of elements, each element of the term-frequency matrix representing a frequency of appearance of a term in a document.

7. The call routing system of claim 6 wherein the training system is further operative to perform weighting on the term-document frequency matrix to create a weighted matrix.

8. The call routing system of claim 7 wherein the training system is further operative to perform normalization on the weighted matrix to create a normalized matrix.

9. The call routing system of claim 8 wherein the normalized matrix is used as a scoring matrix containing scoring information for use in associating a query with a document based on matching terms contained in the query with term information contained in the matrix.

10. The call routing system of claim 9 wherein the routing module includes a term extractor which extracts terms from the query.

11. The call routing system of claim 10 wherein the term extractor assembles the terms extracted from the query into a pseudo-document vector.

12. The call routing system of claim 11 wherein the routing module evaluates the pseudo-document vector is against the scoring matrix to develop a query-document score for each document.

13. The call routing system of claim 12 wherein the routing module compares the query document score for each document against a threshold.

14. The call routing system of claim 13 wherein the routing module routes the call to a destination if one document has a query-document score meeting the threshold, wherein the routing module passes the call for alternative routing if no document has a query-document score meeting the threshold, and wherein the routing module passes the call to the disambiguation module if more than one document has a score meeting the threshold.

15. The call routing system of claim 14 wherein the disambiguation module receives from the routing module the pseudo-document vector and identities of the documents exceeding the threshold.

16. The call routing system of claim 15 wherein the disambiguation module includes a question generator to create disambiguating questions for disambiguating documents.

17. The call routing system of claim 16 wherein the question generator includes a term selector to select close, relevant, and disambiguating terms for creation of disambiguating questions, each selected term being assigned a score, the question generator being operative to use the selected terms in the disambiguating questions.

18. The call routing system of claim 17 wherein the question generator is operative to examine the selected terms to determine if they form a common headword and, if the selected terms form a common headword, to use the common term in forming a question for distinguishing between the terms by asking the customer to provide further information specifying the term that is meant, the question being relayed to the caller and the caller's response being received, the caller's response being passed to the routing module for formation of a new query including the caller's response added to the original query.

19. The call routing system of claim 18 wherein the question generator is further operative, if the selected terms do not form a common headword:
 (a) to form a yes-no question using the selected term having the highest score and receive a response from the caller;
 (b) to evaluate the response to determine if the response is affirmative or negative;
 (c) if the response is negative, to form a question using the next-highest-scoring selected term, relay the question to the caller, receive the caller's response, and return to (b) if the number of attempts does not exceed a predetermined number;
 (d) if the response is affirmative, to route the call to the destination indicated by the selected term.

20. A method of routing calls to one of a plurality of destinations comprising the steps of:
 performing a training phase to create a plurality of documents, each document being associated with a destination, and document information for use in associating a document with a query, the document information including a scoring matrix containing information usable to associate the query with one of the plurality of documents, the training phase comprising the steps of:
  creating a training corpus comprising a plurality of training documents;
  performing morphological processing to convert each training document to a morphologically processed document;
  filtering each morphologically processed document against an ignore list and a stop list to create a filtered training document;
  converting each filtered training document to a routing document;
  creating a term-document frequency matrix using the information in the routing documents;
  weighting the term-document frequency matrix to create a weighted matrix;
  copying the weighted matrix to a scoring matrix;
  resolving the scoring matrix to produce an equivalent matrix set;
  storing the equivalent matrix set in the scoring matrix: and
  creating scoring data from the equivalent matrix set;
 receiving a call and exchanging information with a caller, the step of receiving a call including receiving responses from the caller;
 extracting terms from the responses from the caller to create the query;
 using the query to create a pseudo-document vector;
 computing a query-document score for each document using the pseudo-document vector and the scoring matrix;
 comparing the query-document score for each document against a threshold;
 if no document meets the threshold, routing the call to an alternative routing system;
 if the score for one document meets the threshold, routing the call to the destination associated with the one document; and
 if the score for more than one document meets the threshold, performing disambiguation between the documents.

21. A call routing system for routing a call to a desired destination, comprising:
 a caller interface for conveying information to a caller and receiving caller information from the caller for use in routing of a call;
 a routing module for routing a call to a desired destination based on caller information received by the caller interface, the routing module being operative to formulate a query based on terms contained within the caller information, the routing module being further operative to determine a match between the query and one of a plurality of documents, each of the plurality of documents being associated with a destination, the routing module being operative to route the call to the destination associated with the document matching the query, the routing module being further operative to detect ambiguity in the match between the query and the one of the plurality of documents;

a disambiguation module for disambiguating an ambiguous match between the query and one of the plurality of documents, the disambiguation module being operative to create one or more disambiguating questions to be provided to the caller through the caller interface, the disambiguation module being further operative to receive an answer to the disambiguating questions from the caller interface, the disambiguation module being operative to add information from the answer to the disambiguating questions to the query to produce a refined query, the disambiguation module being further operative to return the refined query to the routing module for use by the routing module in routing the call.

22. A method of routing calls to one of a plurality of destinations comprising the steps of:

performing a training phase to create a plurality of documents, each document being associated with a destination, and document information for use in associating a document with a query, the document information including a scoring matrix containing information usable to associate the query with one of the plurality of documents;

receiving a call and exchanging information with a caller, the step of receiving a call including receiving responses from the caller;

extracting terms from the responses from the caller to create the query;

using the query to create a pseudo-document vector;

computing a query-document score for each document using the pseudo-document vector and the scoring matrix;

comparing the query-document score for each document against a threshold;

if no document meets the threshold, routing the call to an alternative routing system;

if the score for one document meets the threshold, routing the call to the destination associated with the one document; and if the score for more than one document meets the threshold, performing disambiguation between the documents, disambiguation being performed by:

creating one or more disambiguating questions to be provided to the caller;

receiving an answer to the disambiguating questions from the caller;

adding information from the answer to the disambiguating questions to the query to produce a refined query; and using the refined query to route the call.

* * * * *